United States Patent [19]

Brady et al.

[11] Patent Number: 5,879,805

[45] Date of Patent: Mar. 9, 1999

[54] GAS PHASE POLYMERIZATION OF VINYLPOLYBUTADIENE

[75] Inventors: Monika Brady, Hillsborough; Kevin Joseph Cann, Rocky Hill, both of N.J.

[73] Assignee: Union Carbide Chemicals & Plastics Technology Corporation, Danbury, Conn.

[21] Appl. No.: 926,177

[22] Filed: Sep. 9, 1997

[51] Int. Cl.$^6$ .............. B32B 25/16; C08F 4/70; C08F 136/06

[52] U.S. Cl. .......... 428/407; 428/402; 523/207; 524/571; 524/856; 526/129; 526/136; 526/139; 526/140; 526/161; 526/169.1; 526/335; 526/901

[58] Field of Search .............. 526/136, 139, 526/140, 901, 169.1, 63, 129, 161, 335; 523/207; 524/856, 571; 428/402, 407

[56] References Cited

U.S. PATENT DOCUMENTS

| | | | |
|---|---|---|---|
| 3,498,963 | 3/1970 | Ichikawa | 260/94.3 |
| 4,182,813 | 1/1980 | Makino et al. | 526/92 |
| 4,258,160 | 3/1981 | Halasa | 526/138 |
| 4,340,685 | 7/1982 | Takeuchi et al. | 525/427 |
| 4,472,559 | 9/1984 | Maehara et al. | 526/92 |
| 4,645,809 | 2/1987 | Bell | 526/140 |
| 4,742,137 | 5/1988 | Ono et al. | 526/92 |
| 4,751,275 | 6/1988 | Witte et al. | 526/139 |
| 5,011,896 | 4/1991 | Bell et al. | 526/92 |
| 5,278,263 | 1/1994 | Burroway | 526/94 |
| 5,405,816 | 4/1995 | Burroway | 502/108 |
| 5,548,045 | 8/1996 | Goto et al. | 526/161 |

FOREIGN PATENT DOCUMENTS

WO 96/04322 2/1996 WIPO .

OTHER PUBLICATIONS

Ashitaka, Hidetomo et al., "Syndiotactic 1,2–Polybutadiene with Co–$CS_2$ Catalyst System. II. * Catalysts for Stereospecific Polymerization of Butadiene to Syndiotactic 1,2–Polybutadeine", Journal of Polymer Science: Polymer Chemistry Edition, vol. 21, 1951–1972 (1983).

Ashitaka, Hidetomo et al., "Syndiotactic 1,2–Polybutadiene with Co–$CS_2$ Catalyst System. I. Preparation, Properties, and Application of Highly Crystalline Syndiotactic 1,2–Polybutadiene", Journal of Polymer Science: Polymer Chemistry Edition, vol. 21, 1853–1860 (1983).

*Primary Examiner*—Fred M. Teskin
*Attorney, Agent, or Firm*—B. L. Deppenbrock

[57] ABSTRACT

A process for the preparation of a 1,2-vinyl-polybutadiene with an adjustable amount of vinyl linkages in the microstructure of the polymer which comprises polymerizing 1,3-butadiene in a gas phase reactor under polymerization conditions using an inert gas in the presence of a catalyst comprising: (a) a cobalt compound; (b) a compound selected from the group consisting of a phosphine, a xanthogen, a thiocyanide, a carbon disulfide, and mixtures thereof; and (c) an organoaluminum compound, and optionally a modifier (d) can be included in the catalyst composition. There is also provided a novel resin particle prepared by the process.

11 Claims, No Drawings

GAS PHASE POLYMERIZATION OF VINYLPOLYBUTADIENE

FIELD OF THE INVENTION

The present invention relates the production of a polybutadiene with a vinyl microstructure. More particularly, the invention relates to a 1,2-vinylpolybutadiene having an adjustable vinyl content ranging from about 1% to about 99.9% vinyl in the microstructure of the polymer, which polymer is produced in a gas phase polymerization process.

BACKGROUND OF THE INVENTION 1,2-vinyl-polybutadiene has heretofore been produced commercially only in solution, slurry or emulsion processes such as those disclosed in U.S. Pat. Nos. 3,498,963; 3,778,424; 4,182,813;and 5,548,045. There have been numerous problems associated with producing vinylpolybutadiene in these processes: the products are too crystalline or conversely too rubbery; tend to be adversely affected by impurities, particularly moisture, air, and water; require difficult polymerization conditions (e.g., relatively low temperature and/or multiple reactors) for efficient commercial production; incompatibility of solvent medium with catalyst components/combinations; difficulties in controlling molecular weight; contamination with low molecular weight polymers; inability to incorporate a desirable amount of vinyl into the polymer; require a large quantity of catalyst due to low catalyst productivity; low yield of desired product; and so forth. Additionally, these processes are labor and energy intensive, require multiple washing and solvent separation and removal steps, and present environmental concerns. All of which adds to the cost of the product and limits its use and availability on a cost basis in the marketplace.

Finally, the vinylpolybutadiene products produced in these processes are recovered in bales, or bale-like form, such that before an end-user can combine these products with other formulation components, the vinyl-containing polybutadiene products themselves must be first cut, ground and/or pulverized before any significant, subsequent dispersion and distribution in an end-user formulation or processing can occur.

It would be beneficial to conduct a polymerization of vinylpolybutadienes in a gas phase reactor, because such a gas phase polymerization would be advantageous, economical, and inherently safer in that the need to handle and recover large quantities of solvent is eliminated while providing low pressure process operation. However, in view of all of the above-enumerated processing difficulties associated with the production of vinylpolybutadiene in non-gas phase processes, it would be unlikely to expect the production of vinylpolybutadienes in a gas phase process to be possible, much less easy. Rather, one would expect some or many of the same problems associated with non-gas phase processes, as well as problems attributable to gas phase operation. Nor would one expect the product to be readily granular and/or flowable, having an even, fairly homogeneous vinyl microstructure distributed throughout in the polymer.

Surprisingly, the present invention provides such a process and vinylpolybutadiene product.

SUMMARY OF THE INVENTION

Accordingly, there is provided a process for the preparation of a vinylpolybutadiene which comprises polymerizing 1,3-butadiene in a gas phase reactor under polymerization conditions using an inert gas in the presence of a catalyst comprising:

(a) a cobalt compound;
(b) a compound selected from the group consisting of a phosphine compound, a xanthogen compound, a thioisocyanide, a carbon disulfide compound, or a mixture thereof; and
(c) an organoaluminum compound; with the proviso that when a cobalt phosphine is employed an additional phosphine compound is not required. The catalyst composition can additionally contain (d) a modifier.

Further, there is provided a resin particle which is granular and free-flowing comprising a core and a shell in which the core contains a mixture of inert particulate material and vinylpolybutadiene wherein the core mixture is a majority (greater than 50%) of vinylpolybutadiene and the shell contains a mixture of inert particulate material wherein the shell mixture is a majority of inert particulate material (greater than 50%).

DETAILED DESCRIPTION OF THE INVENTION

Polymer. The vinylpolybutadiene produced by the gas phase process of the invention can be a syndiotactic 1,2 (vinyl)-polybutadiene, an isotactic 1,2(vinyl)-polybutadiene, an atactic 1,2(vinyl)-polybutadiene, or a mixture thereof, with a polymer which is predominantly syndiotactic 1,2(vinyl)-polybutadiene being preferred. The vinyl content is adjustable ranging from about 1% to 99.9% vinyl in the microstructure of the polymer. For some end-uses it is desirable to have a lower vinyl content (e.g. form about 30% to about 70% vinyl in the microstructure of the polymer) together with cis- and trans-linkages in the microstructure. Also, polymer having this 30%–70% vinyl content has no or less tacticity compared to a polymer whose vinyl content is higher (e.g. about 80% to about 99.1%).

The vinylpolybutadiene obtained in the process of the present invention can be used in films, fibers and molded articles. It can be employed alone or in admixture with other natural or synthetic rubbers. In addition to natural rubber, synthetic rubbers combinable with the vinylpolybutadienes of the invention can include, for example, styrene-butadiene rubber, butadiene rubber, isoprene rubber, nitrile rubber, chloroprene rubber, ethylene-alpha olefin rubber, ethylene-alpha olefin diene rubber, 1,2-polybutadiene, 1,4-polybutadiene, and the like. Preferably, the vinylpolybutadienes of the invention are used in conjunction with synthetic rubbers produced by gas phase processes. If necessary, it can be extended with a process oil and then mixed with conventional compounding agents for vulcanized rubbers, such as filler, vulcanizing agent, accelerator, tackifier and the like to obtain a rubber composition. The thermoplastic polybutadiene of the present invention is used to make bags, packaging, tubes, hoses, shoe soles, tires and other rubber products. As a vucanizate it is used in rubber applications where mechanical properties and abrasion resistance, for example, are required.

In the vinylpolybutadiene obtained in the present invention, the molecular weight can be varied over a wide range but the reduced average number molecular weight is preferably 5,000 to 1,000,000, more preferably 10,000 to 800,000. The Mooney viscosity ($ML_{1+4}$ 100° C.) of the vinylpolybutadiene obtained in the present invention is preferably about 20–150, more preferably about 30–80.

Polybutadiene (BR) with high vinyl (1,2) content (or HVBR) having 85–99% vinyl groups or with medium vinyl content (or MVBR) having 30–84% vinyl groups can be prepared by the process of the invention. Medium vinyl content polybutadienes tend to be rubbery, thermoset, or amorphous and behave like emulsion polymerized styrene butadiene rubber (SBR). They can be employed in a three-way blend of MVBR/SBR/cis-BR. HVBR, on the other hand, is crystalline or thermoplastic and can be employed in thermoplastic blends and applications.

In accordance with the process of the present invention, a unique, novel core-shell resin particle composed of a mixture of vinylpolybutadiene and inert particulate material is produced. The core-shell resin particle is composed of a mixture of vinylpolybutadiene and inert particulate material in which the mixture in the core contains a majority of polymer and the mixture in the shell contains a majority of inert particulate material. In a preferred embodiment there is produced a resin particle comprising an outer shell having a mixture of an inert particulate material and a vinylpolybutadiene polymer said inert particulate material being present in said outer shell in an amount higher than 75% by weight based upon the weight of said outer shell, and an inner core having a mixture of said vinylpolybutadiene polymer and said inert particulate material, said vinylpolybutadiene polymer being present in said inner core in an amount higher than 90% by weight based on the weight of said inner core. The particle has a cobalt residue ranging from about 2 ppm to about 200 ppm, preferably about 2 ppm to about 100 ppm, most preferably about 2 ppm to about 30 ppm. The particle can also have a phosphorus residue ranging from about 0.5 to 50 ppm, preferably 0.5 to 20 ppm; and sulfide residue ranging from about 0.1 to 250 ppm, preferably 0.1 to 150 ppm. Most preferably, the resin particle being produced by a fluidized bed polymerization at temperatures at or above the softening or sticking temperature of said vinylpolybutadiene. The vinylbutadiene polymer produced by the process of the invention is granular, free-flowing and/or flowable. By flowable is meant that the polymer produced by the process can be conveyed (e.g., by physical or mechanical means) using standard or conventional transporting means and/or processes, e.g. dense phase conveying.

Monomer. The monomer employed in the process of the invention is 1,3-butadiene.

Catalyst. The catalyst composition of the present invention comprises: (a) a cobalt compound; (b) a phosphine, a xanthogen compound, a thioisocyanide, a carbon disulfide compound, or a mixture thereof; and (c) an organoalumium compound. A modifier (d) can additionally be included in the catalyst composition. A cobalt-phosphine complex, a single component, can be employed instead of separate, individual components (a) and phosphine compound of (b). Supported (e.g., on silica, alumina, and/or carbon black) and unsupported (liquid feed or soluble) catalyst systems can be utilized.

Cobalt Compound. The cobalt compound employable in the present invention can have an apparent zero valence to the maximum valence, with a preferred oxidation state of (II) or (III). As such, the cobalt compound is, for example, a cobalt salt of an inorganic or organic acid, a cobalt complex of one of the salts and an electron donor as a ligand. Typically, the cobalt salts of an inorganic acid are cobalt halides (e.g., Cl, Br, and I), cobalt sulfate, cobalt nitrate, cobalt carbonate, cobalt phosphate, cobalt sulfide, cobalt hydroxide, cobalt cyanide, cobalt cyanate, cobalt thiocyanide, and cobalt naphthenate. Cobalt salts of organic acids can include, for example, cobalt octenoate, cobalt acetate, cobalt oxalate, cobalt valerate, cobalt carboxylate, cobalt stearate, cobalt versatate, cobalt benzoate, cobalt butanoate, cobalt hexanoate, cobalt heptanoate, cobalt salts of octanoic acids (such as 2-ethylhexanoic acid), cobalt decanoate; cobalt salts of higher fatty acids (stearic, oleic, etc.), cobalt salts of alkyl-, aralkyl- and aryl-substituted benzoic acids such as xylylic acid, ethylbenzoic acid and the like; cobalt naphthoate; and cobalt salts of alkyl-, aralkyl-, or aryl-substituted naphthoic acids, and the like. The electron donor as a ligand for forming complexes include phosphine compounds; phosphite compounds; pyridine; amines; dipyridyl compounds; phenanthroline; carbonyl; isonitrile; olefins; cyclodiene compounds such as 1,5-cyclooctadiene and cyclopentadiene; vinyl compounds; cyclopentadienyl compounds; π-allyl compounds; 1,3-diketones such as acetylacetone and acetoacetic acid, and so forth. Complex compounds of cobalt such as cobalt bis-acetylacetonate, cobalt bis-acetoacetate, cobalt bis-diethylmalonate, cobalt bis-dimethylglyoxime, dicyclopentadienylcobalt, bis-1,5-cyclooctadiene cobalt, cyclopentadienylcobalt, bis-1,5-cyclooctadiene cobalt, cyclopentadienylcobalt cyclooctatetraene, cobalt tris-acetylacetonate, cobalt tris-acetoacetnate, cyclopentadienylcobalt dicarbonyl, tri-π-allyl cobalt, cyclohexadiene cobalt dicarbonyl, dicobalt octacarbonyl, dibutadienecobalt tetracarbonyl, butadienecobalt hexacarbonyl and the like are employable in the catalyst system of the inventive process.

Preferable of these are cobalt complexes having organic phosphine compounds as ligands are, for example, cobalt-phosphine complexes, $CoX_2(PR^4R^5R^6)_2$ wherein X represents a halogen atom, —CN, or —SCN; and wherein each $R^4$, $R^5$ and $R^6$ are the same or different and represent an $C_1$–$C_8$ alkyl group, a $C_6$–$C_{12}$ aryl group, or a hydrogen atom. Such complexes can include, for example, cobalt bis(triphenylphosphine) dibromide, cobalt bis(triphenylphosphine)dichloride, cobalt bis(tri-m-methylphenylphosphine) dibromide, cobalt bis(tri-m-methylphenylphosphine) dichloride, cobalt bis(tri-p-methylphenylphosphine) dibormide, cobalt bis(tri-p-methylphenylphosphine) dichloride, cobalt bis(tri-p-methoxyphenylphosphine) dibromide, cobalt bis(tri-p-methoxyphenylphosphine) dichloride, cobalt bis (dicyclohexylphenylphosphine)dibromide, cobalt bis (dicyclohexylphenylphosphine) dichloride, cobalt bis(tri-m-dimethylphenylphosphine) dibribromide, cobalt bis(3,5-dimethyl-4-methoxyphenylphosphine) bromide, cobalt bis (3,5-dimethyl-4-methoxyphenylphosphine chloride and the like.

In the present invention, the cobalt compound is used in an amount of about 0.001–1 millimole, preferably about 0.01–0.5 millimole in terms of cobalt atoms per mole of 1,3-butadiene.

Phosphine. If not part of the cobalt complex (a), the phosphine ligand can be added separately to the catalyst system. Typically a tertiary phosphine compound is used in order to control the 1,2-configuration microstructure of the vinylpolybutadiene and the stereroregularity of the 1,2-configuration of the polymer. Preferably tertiary phosphines, having the general formula: $PR^4R^5R^6$, wherein P is phosphorus; and $R^4$, $R^5$, $R^6$ are an alkyl, an aryl, or hydrogen atom, are employed. The preferable alkyl group in the formula is a straight chain-, branched chain-, or cyclic-alkyl group having 1 to 8 carbon atoms, such as methyl, ethyl, propyl, isopropyl, butyl, isobutyl, hexyl, octyl, and cyclohexyl groups. As the aryl group, phenyl and tolyl groups are preferable. These include, for example, aromatic phosphines such as tri(3-methylphenyl)-phosphine, tri(3-ethylphenyl (phosphine, tri(4-methylphenyl)phosphine, tri(3,5-dimethylphenyl)phosphine, tri(3,4-dimethylphenyl) phosphine, tri(3-isopropylphenyl)phosphine, tri(3- tertbutylphenyl)phosphine, tri(3,5-dimethylphenyl) phosphine, tri(3-methyl-5-ethylphenyl)-phosphine, tri(3-phenylphenyl)phosphine, tri(3,4,5-trimethyl-phenyl) phosphine, tri(4-methoxy-3,5-dimethylphenyl)phosphine, tri(4-ethoxy-3,5-diethylphenyl)phosphine, tri(4-butoxy-3,5-dibutylphenyl)-phosphine, tri(4-methoxyphenyl)phosphine, tricyclohexylphosphine, dicyclohexylphenylphosphine, dicyclohexylbenzylphosphine, tribenzylphenylphosphine, tri(4-methylphenyl)phosphine, 1,2-diphenylphosphinoethane, 1,3-diphenylphosphinopropane, 1,4-diphenylphosphinobutane, tri(4-ethylphenyl)phosphine and the like, and aliphatic phosphines such as triethylphosphine, tributylphosphine and the like. Of these, particularly preferable are triphenylphosphine, tri(3-methylphenyl)phosphine, tri(4-methoxy-3,5-dimethylphenyl)phosphine, tri(4-methoxyphenyl) phosphine, tri(dicyclohexylphenyl)phosphine, tricyclohexylphosphine, tribenzylphosphine, tributylphosphine, dicyclohexylbenzylphosphine and tri(4-methylphenyl)phosphine.

The phosphine is used in the catalyst in an amount ranging from about 0.01–10 moles per mole of cobalt compound, preferably from about 0.05–5 moles per mole of cobalt compound.

Xanthogens, Thioisocyanides, and Carbon Disulfide. Instead of, or in addition to a phosphine compound, a sulfur derivative may be added. Use of a sulfur derivative in the process of the invention enables one to adjust the vinyl content from 50% to 99.9%. Such sulfur derivatives can include carbon disulfide, a xanthogen compound, a thioisocyanide compound or mixture thereof can be employed as catalyst component (b). Suitable xanthogen compounds are disclosed, for example, in U.S. Pat. No. 4,742,137. Specific examples of xanthogen compounds include diethylxanothogen sulflide, dimethylxanthogen sulfide, phenylxanthogen sulfide, tolylxanthogen sulfide, and mixtures thereof. Suitable thioisocyanide compounds are disclosed, for example, in U.S. Pat. No. 5,548,045. Specific examples of the thioisocyanide compound include phenyl thioisocyanide, tolyl thioisocyanide, and mixtures thereof. Relative to the cobalt compound, these compounds (xanthogen, thioisocyanide, $CS_2$, etc.) are employed in the same range as reported for phosphine above, that is, in amounts ranging from about 0.05–10 moles per mole of cobalt compound (a).

Organoaluminum. The organoaluminum compound used as component (c) is represent by one of the three following formulae:

(I) $AlR_3$ (II) $AlR^1{}_mX_{3-m}$ (III) $AlR_n{}^2(OR^3)_{3-n}$ wherein each R, $R^1$, $R^2$, $R^3$ is the same or different and is a straight chain or branched alkyl group having 1 to 12 carbon atoms, preferably 1 to 8 carbon atoms, an aryl group (e.g., phenyl or tolyl), or a hydrogen; X is halogen (F, Cl, Br, and I, with Cl preferred); m is 0, 1, 1.5, or 2; and $\underline{n}$ is 1 or 2. The organoaluminum compounds include alkylaluminums, halogenated alkylaluminum compounds, and alkylaluminum alkoxides, alkylaluminum hydroxides, and alkylaluminum hydrides. When organoaluminum compounds of formulae (I)–(III) are employed as catalyst component (c) in the process of the invention, water employed as well. The amount of water added along with component (c) for organoaluminum compounds of formulae (I)–(III) is in an amount of 0.25 to 1.5 mols per mol of the organoaluminum compound. The organoaluminum can also be:

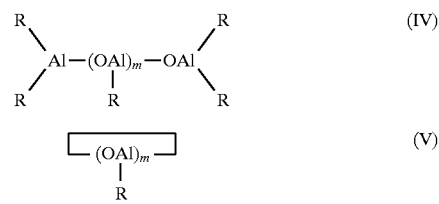

wherein in (IV) and (V) each R is a hydrocarbon group, preferably the R's represent the same hydrocarbon groups, such as methyl, ethyl, propyl, butyl; $\underline{m}$ represents an integer of 2 to 100. Specific examples of the aluminoxane include methylaluminoxane, ethylaluminoxane, propylaluminoxane, butylaluminoxane, modified methyl alumninoxane, and the like.

The organoaluminum compound is used so as to give an Al/Co atomic ratio of aluminum atoms in (c) to cobalt atoms in (a) of 4–$10^7$, more preferably 10–$10^6$. The molar ratio of the cobalt compound to the organoaluminum compound is usually from 1/1 to 1/1,000, preferably from 1/5 to 1/100.

Modifier. There may additionally be included an additive for controlling the 1,2 configuration of the microstructure of the vinylpolybutadiene obtained and also for changing the crystallinity of the polymer. These modifiers (d) can include, for example, amides, aldehydes (as disclosed in U.S. Pat. Nos. 5,011,896 and 5,278,263) or tertiary amines (as disclosed in U.S. Pat. Nos. 3,778,424 and 4,258,160). Preferred among these are triethylamine, tributylamine, and N,N-dibutylformamide (DBF). When a modifier such as DBF is used, it is added to the reaction mixture in the gas phase reactor either neat, as a solution, or pre-contacted with one or all of the catalyst components in any order.

The amount of modifier used in the catalyst is 0.05–10 moles per mole of cobalt compound, preferably from 2–7 moles per mole of cobalt compound.

Gel Suppressor. Gel suppressors such as amines, ethers and the like can be employed if desired. Typical gel suppressors and their use are described in U.S. Pat. No. 5,652,304.

Catalyst Preparation. The catalyst used in the present invention is prepared by adding individual components in any desired order and mixing them preferably in a hydrocarbon or halogenated hydrocarbon solvent or the components are added separately. The preparation may be effected before the catalyst contacts with 1,3-butadiene, or may be effected by mixing the components in the presence of 1,3-butadiene in the reactor. The solvent is an inert organic solvent and includes aromatic hydrocarbon solvents such as benzene, toluene, xylene, methylene chloride, cumene and the like; aliphatic hydrocarbon solvents such as pentane, hexane, butane and the like; alicyclic hydrocarbon solvents such as methylcyclopentane, cyclohexane and the like; halogenated hydrocarbon solvents such as methylene chloride, chloroform, carbon tetrachloride, 1,2-dichloroethane, trichloroethylene, perchloroethylene, chlorobenzene, bromobenzene, chlorotoulene, and the like; and mixtures thereof. The catalyst can be supported by mixing the support material, the metal component, cocatalyst, optional promoter in any order in an inert solvent or diluent. When the metal component is supported, typical supports can include, for example, silica, carbon black, porous crosslinked polystyrene, porous crosslinked polypropylene, alumina, or magnesium chloride support materials. Of these support materials, carbon black and silica, and mixtures of carbon black and silica are preferred. A typical silica or alumina support is a solid, particulate, porous material essentially inert to the polymerization. It is used as a dry powder having an average particle size of about 10 to about 250 microns and preferably about 30 to about 100 microns; a surface area of at least 200 square meters per gram and preferably at least about 250 square meters per gram; and a pore size of at least about 100 Angstroms, preferably at least about 200 Angstroms. Generally, the amount of support used is that amount which will provide about 0.1 to about 1.0 millimole of rare earth metal per gram of support. In a most preferred embodiment, two types of carbon black are used as support. DARCO G-60 (pH of water extract=5) is used as dry powder having a surface area of 505 square meters per gram, average particle size of 100 microns, and porosity of 1.0 to 1.5 cubic centimeter per gram. NORIT A (pH of water extract=9–11) used as a dry powder has a surface area of 720 square meters per gram, average particle size of 45 to 80 microns. These supports are both available from Aldrich.

In general the metal component can be impregnated on a support by well known means such as by dissolving the metal compound in a solvent or diluent such as a hydrocarbon, chlorinated hydrocarbon, or ether (including aliphatic, cycloaliphatic or aromatic compounds such as pentane, isopentane, hexane, cyclohexane, benzene, toluene, tetrahydrofuran, and methylene chloride) in the presence of the support material and then removing the solvent or diluent by evaporation such as under reduced pressure. Alternatively, the metal component can be dissolved in a solvent or diluent such as a hydrocarbon or tetrahydrofuran and spray dried to generate a well-shaped catalyst precursor having little or no silica or other inorganic solids content, if desired.

A preferred method for making one of the catalyst components of this invention involves impregnating a silica support, a carbon black support, or a mixed support of the two with a cobalt containing compound. The amount of metal impregnated on the support can range between 0.1 and 1.0 mmole/g catalyst. An organic alkyl aluminum compound may be added prior, during or subsequent to the impregnation step, either in a hydrocarbon such as those previously mentioned or in an oxygenated solvent such as THF. The catalyst may be isolated as a dry solid or used as a slurry in a diluent.

A most preferred procedure for making the catalysts of the invention by treating a silica support, carbon black support, or mixture with the cobalt compound in a suitable solvent followed by solvent removal.

The catalyst may also be prepared without a support by simple contact of the metal with the alkyl aluminum compound to form a solution or slurry which is fed directly to the reactor. The Al to metal ratio in the catalyst preparation step may vary between 0.5 to 1000. The polymerization metal may be used without aluminum treatment when the aluminum alkyl is fed separately to the reactor along with the other additives and modifiers.

In order to prevent the deactivation of the catalyst, it is desirable to take measures to avoid or minimize the incorporation of deactivating compounds such as oxygen, water, carbon dioxide, carbon monoxide and the like into the catalyst preparation and polymerization system. Accordingly, it is preferred to conduct the polymerization and prepare the catalyst in an inert atmosphere (nitrogen, argon, isopentane, ethane, butane, etc.)

Polymerization Processes and Conditions. The present invention is not limited to any specific type of stirred or fluidized gas phase polymerization reaction and can be carried out in a single reactor or multiple reactors (two or more reactors preferably connected in series). In addition to well-known conventional gas phase polymerizations processes, "condensed mode", including the so-called "induced condensed mode", and "liquid monomer" operation of a gas phase polymerization reactor can be employed.

A conventional fluidized bed process for producing resins is practiced by passing a gaseous stream containing one or more monomers, usually one monomer, continuously through a fluidized bed reactor under reactive conditions in the presence of above-described catalyst. Product is withdrawn from the reactor. A gaseous stream of unreacted monomer is withdrawn from the reactor continuously and recycled into the reactor along with make-up monomer added to the recycle stream. Conventional gas phase polymerizations are disclosed, for example, in U.S. Pat. Nos. 3,922,322; 4,035,560; and 4,994,534. Optionally, and preferably, a conventional polymerization of the present invention is conducted in the presence of one or more inert particulate materials as described in U.S. Pat. No. 4,994,534.

Condensed mode polymerizations are disclosed in U.S. Pat. Nos. 4,543,399; 4,588,790; 4,994,534; 5,352,749; and 5,462,999. Condensing mode processes are employed to achieve higher cooling capacities and, hence, higher reactor productivity. In these polymerizations a recycle stream, or a portion thereof, can be cooled to a temperature below the dew point in a fluidized bed polymerization process, resulting in condensing all or a portion of the recycle stream. The recycle stream is returned to the reactor. The dew point of the recycle stream can be increased by increasing the operating pressure of the reaction/recycle system and/or increasing the percentage of condensable fluids and decreasing the percentage of non-condensable gases in the recycle stream. The condensable fluid may be inert to the catalyst, reactants and the polymer product produced; it may also include monomers and comonomers. The condensing fluid can be introduced into the reaction/recycle system at any point in the system. Condensable fluids include saturated or unsaturated hydrocarbons. In addition to condensable fluids of the polymerization process itself, other condensable fluids, inert to the polymerization can be introduced to "induce" condensing mode operation. Examples of suitable condensable fluids may be selected from liquid saturated hydrocarbons containing 2 to 8 carbon atoms (e.g., ethane, propane, n-butane, isobutane, n-pentane, isopentane, neopentane, n-hexane, isohexane, and other saturated $C_6$ hydrocarbons, n-heptane, n-octane and other saturated $C_7$ and $C_8$ hydrocarbons, and mixtures thereof). Preferred condensable fluids for use in the process of the invention include n-butane, isobutane, isopentane, and mixtures thereof. Condensable fluids may also include polymerizable condensable comonomers such as olefins, alpha-olefins, diolefins, diolefins containing at least one alpha olefin, and mixtures thereof. In condensing mode, it is desirable that the liquid entering the fluidized bed is dispersed and vaporized quickly.

Liquid monomer polymerization mode is disclosed in U.S. Pat. No. 5,453,471; U.S. Ser. No. 510,375; PCT 95/09826 (U.S.) and PCT 95/09827 (U.S.). When operating in the liquid monomer mode, liquid can be present throughout the entire polymer bed provided that the liquid monomer present in the bed is adsorbed on or absorbed in solid particulate matter present in the bed, such as in/on polymer being produced or fluidization aids, also known as inert particulate materials (e.g., carbon black, silica, clay, talc, and mixtures thereof) present in the bed, so long as there is no substantial amount of free liquid monomer present. Liquid mode makes it possible to produce polymers in a gas phase reactor using monomers having condensation temperatures much higher than the temperatures at which conventional polyolefins are produced.

In general, a liquid monomer process is conducted in a stirred bed or gas fluidized bed reaction vessel having a polymerization zone containing a bed of growing polymer particles. The process comprises continuously introducing a stream of one or more monomers and optionally one or more inert gases into the polymerization zone optionally in the presence of one or more inert particulate materials; continuously or intermittently introducing a pre-activated nickel polymerization catalyst as described herein into the polymerization zone; continuously or intermittently withdrawing polymer product from the polymerization zone; and continuously withdrawing unreacted gases from the zone; compressing and cooling the gases while maintaining the temperature within the zone below the dew point of at least one monomer present in the zone. If there is only one monomer present in the gas-liquid stream as in the process of the present invention, there is also optionally and preferably present at least one inert gas. Typically, the temperature within the zone and the velocity of gases passing through the zone are such that essentially no liquid is present in the polymerization zone that is not adsorbed on or absorbed in solid particulate matter. The use of fluidization aids is preferred in the liquid monomer process and in the process of the present invention. In view of the dew points or condensation temperatures of the diene employed in the gas phase polymerization process of the present invention, liquid monomer mode is the preferred polymerization mode.

In general, the elastomers such as those of the present invention are produced in a gas-phase fluidized reactor at or above the softening or sticking temperature of the polymer product optionally and preferably in the presence of an inert particulate material selected from the group consisting of carbon black, silica, clay, talc, and mixtures thereof. Of the inert particulate materials, carbon black, silica, and a mixture thereof are preferred, with carbon black being most preferred. The inert particulate material is employed in the gas-phase polymerization in an amount ranging from about 0.3 to about 80 weight percent, preferably about 5 to about 75 weight percent, most preferably 5 to 50 weight percent based on the weight of the final elastomeric polymer product. However, when preparing high vinyl, high syndictactic BR, it is not always necessary to use carbon black or other inert particulate material, since the polymer is thermoplastic and not elastomeric.

Preferably the reactor system is passivated with the organoaluminum cocatalyst compound prior to commencing polymerization. Optionally, and preferably, the inert particulate material and/or the seed bed are also passivated with the organoaluminum compound.

Generally, all of the above modes of polymerizing are carried out in a gas phase fluidized bed made up of or containing a "seed bed" of polymer which is the same or different from the polymer product being produced. The bed is preferably made up of the same granular resin that is to be produced in the reactor. Thus, during the course of the polymerization, the bed comprises formed polymer particles, growing polymer particles, and catalyst particles fluidized by polymerizing and modifying gaseous components introduced at a flow rate or velocity sufficient to cause the particles to separate and act as a fluid.

The fluidizing gas is made up of the initial feed, make-up feed, and cycle (recycle) gas, i.e., monomer, and, if desired, modifiers and/or an inert carrier gas (e.g., nitrogen, argon, or inert hydrocarbon (e.g., a $C_1$–$C_{20}$ alkane such as isopentane or butane), with nitrogen and/or butane being preferred). A typical cycle gas is comprised of the monomer, inert carrier gas(es), and optionally hydrogen, either alone or in combination. The process can be carried out in a batch or continuous manner, the latter being preferred. The essential parts of the reactor are the vessel, the bed, the gas distribution plate, inlet and outlet piping, at least one compressor, at least one cycle gas cooler or heat exchanger, and a product discharge system. In the vessel, above the bed, there is a velocity reduction zone, and in the bed, a reaction zone. Both are above the gas distribution plate.

Variations in the reactor can be introduced if desired. One involves the relocation of one or more cycle gas compressors from upstream to downstream of the cooler and another involves the addition of a vent line from the top of the product discharge vessel (stirred tank product) back to the top of the reactor to improve the fill level of the product discharge vessel.

In general the polymerization conditions in the gas phase reactor are such that the temperature ranges from about 0° to 120° C., preferably about 40° to 100° C., and most preferably about 35° to 80° C. Partial pressure will vary depending upon the temperature of the polymerization, and it can range from about 1 to 125 psi. Condensation temperature of the monomer is well known and is −4.5° C. at atmospheric pressure. In general, it is preferred to operate at a partial pressure slightly above to slightly below (that is, ±10 psi) the dew point of the monomer. For example, for 1,3-butadiene, the partial pressure ranges from about 10 to about 100 psi. Total reactor pressure ranges from about 100 to about 500 psi. Typically, the process of this invention is operated to have a space-time-yield ratio (STY) of about 1:10. That is, generally a longer residence time required than that used for alpha olefin polymerizations. The higher the space-time-yield ratio the faster the polymer product is produced in the reactor. When employed, solution catalysts are fed to the reactor in accordance with U.S. Pat. No. 5,317,036.

According to the present process, the vinyl content in the polybutadiene obtained can be easily controlled over a wide range by, for example, controlling the polymerization temperature. Thus, for example, higher temperatures (e.g., 50° to 80° C.) result in higher amounts of vinyl linkages into the polymer, while lower temperatures (e.g., 25° to 40° C.) result in lower amounts of vinyl linkages being incorporated into the final polymer.

When the polymerization reaction has reached a desired stage or is to be terminated, there is added to the reaction an alcohol or other terminator or catalyst deactivator such ammonia or water. There may also be added a stabilizing package comprising one or more of and age retardant, an antioxidant, antiozoant, an ultraviolet absorber, etc. Then the vinypolybutadiene is purged with an inert gas, optionally and inert gas and water, to remove unreacted monomer which is recycle to the gas phase reactor.

All references cited herein are incorporated by reference.

The invention is illustrated by the examples which follow. All parts and percentages are by weight unless otherwise specified.

EXAMPLES

Polymer Product Characterization. In the Examples, measurements of properties were made in accordance with the following methods:

The weight of the polymer was used to determine yield. The microstructure was determined by IR. Melting point was obtained by DSC. Estimates of molecular weights were obtained by measuring reduced viscosity, but GPC data were also collected. GPC data were obtained with a Waters® 590 instrument and ERMA® ERC-7510 differential refractometer detector at ambient temperature with Waters® Styragel columns and tetrahydrofuran or toluene as the mobile phase. Polystyrene standards were used for calibration in the molecular weight range from 162 to 1,800,000.

Reduced viscosity (RV), or reduced specific viscosity (RSV), or viscosity number, is a measure of the ability of a polymer to increase the viscosity of a solvent. It is the ratio of the specific viscosity of a solution to the concentration of (c) of the solute. In a diluted polymer solution, c is usually expressed as grams of polymer per deciliter (dl) of solution. The specific viscosity is obtained by comparing the retention time (t) taken for a solution of known concentration to flow between two marks on a capillary tube with the retention time taken by the solvent ($t_o$). The definition is the following:

$$\pi_{sp}=(t-t_o)/t_o$$

$$\pi_{red}=\pi_{sp}/c$$

Reduced viscosity is expressed in the unit of dl/g.

In this application, RV is determined by the following procedure: 0.15 g of stabilized flow-aid containing BR and 50 mL of toluene were added in a 100-mL screw cap bottle. The mixture was shaken overnight at room temperature and separated by first centrifugation, then filtration through glass wool and finally filtration through a "millipore" filter. Solution thus obtained was added in a Cannon-Fenske® Viscometer and retention time was measured at 30° C. RV is calculated using equation:

$$RV=[(t-t_o)/t_o]/c$$

The concentration c was determined by evaporating solvent from an aliquot of 25 mL of the solution and weighing the polymer residue in a aluminum dish.

The following examples utilize five different cobalt catalyst systems, namely (A) $CoCl_2(PPh_3)_2$, (B) $CoBr_2(PPh_3)_2$, (C) (1-Methyl allyl)(buta-1,3 diene)triphenylphosphine cobalt, (D) $CoCl_2(Pyridine)_4$, and (E) $Co(acac)_3$ in conjunction with 3 eq. $CS_2$.

$Co(acac)_3$, $CoBr_2$, $CS_2$, $PPh_3$ were purchased from Aldrich Chemical Company, $CoCl_2$ from AlfaAesar and MAO (1.8M in toluene) from Akzo Nobel and used without further purification. All solvents were dried by standard procedures and then distilled under nitrogen atmosphere. (1-methyl allyl)(buta-1,3-diene)triphenylphosphine cobalt was prepared according to G. Vitulli, L. Porri, A. L. Segre, *J. Chem. Soc (A)* 1971, 3246. $CoCl_2(Pyridine)_4$ was prepared by stirring $CoCl_2$ in distilled pyridine overnight.

Preparation of $CoCl_2(PPh_3)_2$ $CoCl_2$ (4.3 g) was dissolved in 30 ml ethanol under inert nitrogen atmosphere at a slightly elevated temperature. Triphenyl phosphine (20 g) was placed in a second flask and mixed with 130 ml distilled ethanol. To this stirred slurry the $CoCl_2$ solution was slowly added via syringe. The mixture was stirred in a warm water bath under nitrogen pressure for 15 min. The catalyst was transferred into an inert frit and washed first with ethyl acetate, then with ethanol and dried under high vacuum.

Isolated yield: 19.7 g of $CoCl_2(PPh_3)_2$.

Preparation of Co $Br_2(PPh_3)_2$

An analogous procedure was used to make $CoBr_2(PPh_3)_2$ from 7.3 g $CoBr_2$. However, instead of ethanol, acetone was used and the catalyst was washed three times with acetone only and then dried under high vacuum. Isolated yield: 20.0 g of $CoBr_2(PPh_3)_2$.

Catalyst Procedures

Different procedures of catalyst pretreatment, modifier additions and order of additions of catalyst components to the reactor were accomplished as follows:

Procedure a: Separate addition of catalyst and cocatalyst

Catalyst and cocatalyst are added separately to the reactor, catalyst first and the polymerization was started by adding the cocatalyst last.

Procedure b: Premix Catalysts with Cocatalyst

The desired amount of catalyst (e.g. 0.05 mmole) was sealed in the dry box into a 10 ml crimp top bottle. The bottle was brought out and placed under nitrogen purge. Distilled toluene (2 ml) and 100 eq. of MAO (1.8M in toluene) was injected into the bottle. The purge needle was removed and the bottle remained under nitrogen pressure. A color change from blue-green to golden-yellow was observed in most cases. The premix was stirred for 5 min. at room temperature before being injected into the reactor. When Carbon disulfide($CS_2$) was used, it was added to the premix right after the cocatalyst.

Procedure c and d: Support Catalyst onto Silica (c) and Activated Carbon (d)

The desired amount of catalyst, silica (or activated carbon) and freshly distilled solvent was placed into an airless flask under inert nitrogen atmosphere. The mixture was stirred at room temperature for 30 min. The solvent was then removed under high vacuum until a free flowing powder remained. Catalyst, support, solvent and resulting catalyst loadings for different examples are summarized in Table 1.

TABLE 1

Data Summary of Catalyst Support

| Examples No. | Catalyst (g) | Support (g) | Solvent (ml) | Loading mmole/g |
|---|---|---|---|---|
| 4, 5 | A 1.0 g | Silica 958–600 | 2.8 g THF | 25 ml | 0.40 |
| 6 | A 1.0 g | Activated Carbon | 2.8 g THF | 25 ml | 0.40 |
| 10, 11 | B 1.2 g | Silica 958–600 | 4.0 g Methylene Chloride | 35 ml | 0.30 |
| 13 | C 0.4 g | Silica 958–600 | 3.0 g Toluene | 20 ml | 0.29 |

Procedure e and f: Modifier Addition

A modifier was added into the reactor after passivation, before catalyst and cocatalyst. The molar ratio of modifier to cobalt compound was 5:1. Modifiers were tributylamine (e) and gaseous ammonia (f). The modifiers were employed to control the vinyl content.

Procedure g: Addition of Free Ligand Triphenylphosphine

In this procedure catalyst and cocatalyst were premixed similar to procedure (b) but together with a free phosphine ligand. Catalyst (0.05 mmole) and 0.05 mmole triphenylphosphine were sealed in crimp top bottle under nitrogen. Distilled toluene (2 ml) and 200 eq. of MAO (1.8M in toluene) were injected into the bottle. The premix was stirred for 5 minutes at room temperature before being injected into the reactor.

Lab-scale Gas Phase Polymerization Procedure.

A reaction vessel (one-liter, stirred metal autoclave) was charged with inert particulate material and dried with nitrogen at 90° C. for one hour. The temperature in the vessel was adjusted to the desired temperature, and a small initial charge of cocatalyst was added to passivate the vessel, e.g., with 0.08 mmole organoaluminum compound per gram of particulate material. Preferably the organoaluminum used in passivation is the same as the cocatalyst used in the subsequent polymerization. The vessel was pressure purged with butadiene before the desired amount of catalyst was added. Catalyst and cocatalyst were either added separately or premixed. The vessel was pressurized with butadiene to be polymerized. The feed rate was adjusted so that a constant pressure was maintained during the reaction. The polymerizations were terminated using a stabilizer package and methanol alone or methanol and water washings and the product was dried under vacuum. Variations in parameters of the Examples 1–17 are set forth in Table 2.

Examples 1–3 employed $CoCl_2(PPh_3)_2$, (catalyst A) at different temperatures between 20° and 50° C. The catalyst showed good activity in the gas phase polymerization. Polymer having a vinyl content between 50% and about 60% was obtained. Molecular weight can be controlled by polymerization temperature and ranged from about 111,000 to about 235,000 average number molecular weight.

Examples 4–9 are variations of Examples 1–3 as followed: Examples 4 and 6 demonstrate the use of supported catalyst on silica or activated carbon, respectively. Example 5 employed DEACO as a cocatalyst. Higher vinyl content was obtained with DEACO (diethylaluminum chloride treated with 0.25 eq. $H_2O$) but catalyst activity and polymer molecular weight were higher with MAO as a cocatalyst. Examples 7 and 8 used modifiers, triethylamine and ammonia, respectively, to control microstructure. Additives of this kind can also function as gel suppressers if desired. Example 9 is a variation of Example 2, but with additional free triphenylphosphine ligand. Results were similar, except that vinyl content decreased to 37%.

Examples 10–13 used $CoBr_2(PPh_3)_2$, (catalyst B). Very good catalyst activity was illustrated for unsupported (Example 10) and supported (Example 12) catalyst. Examples 11 and 13 demonstrated polymerization at 60° C.

Examples 14 and 15 illustrated the feasibility of (1-Methylallyl)(buta-1,3-diene)(triphenyl phosphine)cobalt (catalyst C) for the gas phase polymerization of butadiene to produce 1,2-vinyl polybutadiene.

Examples 16 utilized $CoCl_2(Pyridine)_4$ (catalyst D) in conjunction with free ligand triphenylphosphine (equimolar). Good catalyst activity gave polymer with high molecular weight and 35.7% vinyl linkages.

Example 17 demonstrated the production of syndiotactic high vinyl polybutadiene. The utilized catalyst was $Co(acac)_3$ precontacted with 100 eq. MAO and 3 eq. modifier $CS_2$. The polymer was of very high crystallinity with a melting point of 205.7° C. by DSC, indicating highly syndiotactic high vinyl BR. The product was insoluble in toluene.

TABLE 2

Vinyl BR Gas Phase Experiments

| Examples No. | Catalyst[a], Procedure[b] | Cocatalyst ratio cocat:cat | Temp °C. | Bd psig | Productivity[c] | cis wt % | vinyl wt % | Red V n red | Mn ×1000 | DI |
|---|---|---|---|---|---|---|---|---|---|---|
| 1 | (A), a | MAO 100 | 20 | 10 | 934 | 46.8 | 53.2 | 2.8 | 235 | 2.8 |
| 2 | (A), b | MAO 100 | 30 | 10 | 954 | 45.9 | 54.1 | 2.2 | 170 | 3.0 |
| 3 | (A), b | MAO 100 | 50 | 20 | 1037 | 42.9 | 57.1 | 1.5 | 111 | 3.8 |
| 4 | (A), a, c | MAO 100 | 30 | 10 | 396 | 47.8 | 52.2 | 2.8 | 209 | 3.1 |
| 5 | (A), a, c | DEACO 100 | 30 | 10 | 155 | 25.2 | 73.7 | 0.7 | 25 | 4.6 |
| 6 | (A), a, d | MAO 100 | 30 | 10 | 320 | 45.9 | 54.1 | 3.0 | 294 | 2.9 |
| 7 | (A), b, e | MAO 100 | 35 | 21 | 848 | 53.0 | 47.0 | 2.3 | 223 | 2.9 |
| 8 | (A), b, f | MAO 100 | 35 | 20 | 485 | 64.2 | 35.8 | 2.3 | 127 | 4.1 |
| 9 | (A), g | MAO 200 | 30 | 20 | 1066 | 63.0 | 37.0 | 2.3 | 159 | 4.0 |
| 10 | (B), b | MAO 100 | 30 | 20 | 1786 | 35.2 | 64.8 | 3.0 | 222 | 3.0 |
| 11 | (B), b | MAO 100 | 60 | 24 | 227 | 54.3 | 45.7 | 1.1 | 37 | 6.4 |
| 12 | (B), a, c | MAO 100 | 30 | 20 | 1379 | 51.6 | 48.4 | 2.6 | 178 | 3.3 |
| 13 | (B), b, c | MAO 100 | 60 | 10 | 487 | 46.2 | 53.8 | 1.3 | 58 | 5.5 |
| 14 | (C), a | MAO 100 | 30 | 10 | 131 | 50.0 | 50 | 1.4 | 99 | 3.3 |
| 15 | (C), a, c | MAO 100 | 30 | 10 | 368 | 37.3 | 62.7 | 2.0 | 150 | 4.0 |
| 16 | (D), g | MAO 200 | 30 | 20 | 824 | 64.3 | 35.7 | 4.9 | 259 | 3.9 |
| 17 | (E), b | MAO 100 | 30 | 20 | 29 | | | | | |

[a])(A) CoCl2(PPh3)2,
(B) CoBr2(PPh3)2,
(C) (1-Methyl allyl)(buta-1,3 diene)triphenylphosphine cobalt and
(D) CoCl2(Pyridine)4,
(E) Co(acac)3 in conjunction with 3 eq. CS2.
[b])a - g see experimental.
[c])g polymer/mmole catalyst * hr.

What is claimed is:

1. A process for the preparation of a vinyl-polybutadiene comprising polymerizing 1,3-butadiene in a gas phase reactor under polymerization conditions using an inert gas in the presence of a catalyst comprising:

(a) a cobalt compound;
   (b) a compound selected from the group consisting of a phosphine, xanthogen, a thioisocyanide and mixture thereof; and
   (c) an organoalumium compound;

with the proviso that when a cobalt phosphine is employed an additional phosphine (b) is not required.

2. The process of claim 1 wherein an inert particulate material is employed in the polymerization.

3. The process of claim 1 wherein the cobalt compound is selected from the group consisting of cobalt salts of inorganic acids; cobalt salts of organic acids; a cobalt complex; cobalt salts of higher fatty acids; cobalt salts of alkyl-, arylaralkyl-substituted benzoic acids; cobalt naphthoate; cobalt salts of alkyl-, aralkyl- and aryl- substituted naphthoic acids; and mixtures thereof.

4. The process of claim 1 wherein the phosphine of (b) is a tertiary phosphine having the formula: $PR^4R^5R^6$, in which P is phosphorus and $R^4$, $R^5$, and $R^6$ are the same or different and are an alkyl, aryl, or hydrogen; wherein the xanthogen is selected from the group consisting of diethylxanothogen sulfide, dimethylxanthogen sulfide, phenylxanthogen sulfide, tolylxanthogen sulfide, and mixtures thereof; and wherein the thioisocyanide compound is selected from the group consisting of phenyl thioisocyanide, tolylthioisocyanide, and mixtures thereof.

5. The process of claim 1 wherein the organoaluminum is represented by one of the following formulae:

(I) $AlR_3$ (II) $AlR^1mX_{3-m}$ (III) $AlR_n^2(OR^3)_{3-n}$ wherein each R, $R^1$, $R^2$, $R^3$ is the same or different and is a straight chain or branched alkyl group having 1 to 12 carbon atoms, an aryl group or a hydrogen; X is halogen; $\underline{m}$ is 0, 1, 1.5, or 2; and $\underline{n}$ is 1 or 2;

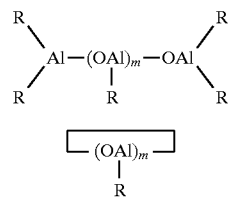

(IV)

(V)

wherein in (IV) and (V) each R is the same or different and is a hydrocarbon group, and m represents an integer of 2 to 100.

6. The process of claim 1 wherein the catalyst additionally comprises a modifier selected from the group consisting of an amide, an aromatic aldehyde, a tertiary amine, and mixtures thereof.

7. The process of claim 1 wherein the catalyst comprises $CoBr_2(PPh_3)_2$ and MAO and are employed in a cobalt to organoaluminum ratio of 1:40–400.

8. The process of claim 1 wherein the catalyst comprises $CoCl_2$ (Pyridine)$_4$, $PPh_3$ and MAO in a ratio of 1:0.5–2:40–400.

9. The process of claim 1 wherein the amount of (a):(b):(c) ranges from 1:0.1:10 to 1:10:1000.

10. A resin particle which is granular and free-flowing comprising a core and a shell in which the core contains a mixture of inert particulate material and vinylpolybutadiene wherein the core mixture is greater than 50% by weight vinylpolybutadiene and the shell contains a mixture of inert particulate material wherein the shell mixture is greater than 50% by weight inert particulate material; and wherein the particle has a cobalt residue ranging from about 2 ppm to about 200 ppm.

11. A resin particle comprising an outer shell having a mixture of an inert particulate material and a vinylpolybutadiene, said inert particulate material being present in said outer shell in an amount higher than 75% by weight based upon the weight of said outer shell, and an inner core having a mixture of said vinylpolybutadiene and said inert particulate material, said vinylpolybutadiene being present in said inner core in an amount higher than 90% by weight based on the weight of said inner core.

* * * * *